Aug. 16, 1966   W. G. MUSCHETT   3,266,768
QUICK-CONNECT/DISCONNECT SPRINKLER COUPLING FOR
REPLACING SPRINKLERS IN AN IRRIGATION SYSTEM
Filed Aug. 4, 1965   2 Sheets-Sheet 1
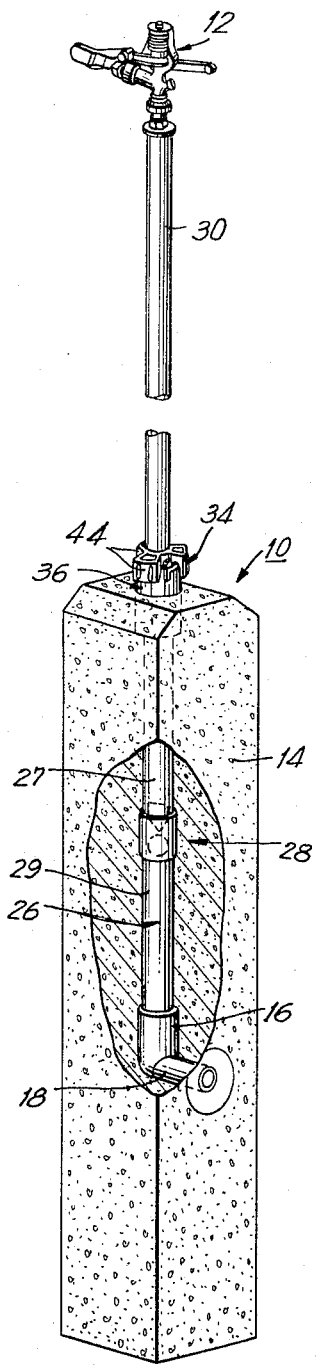
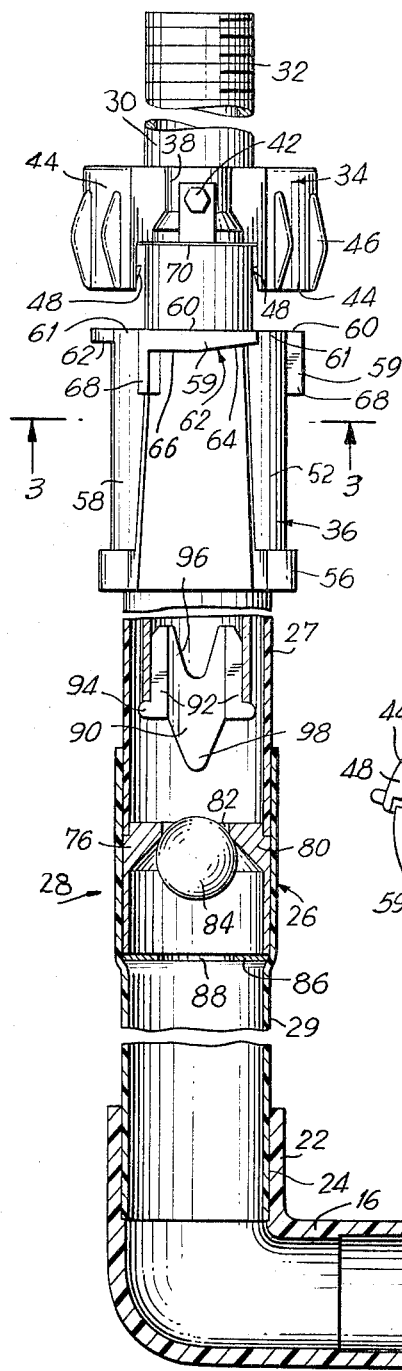
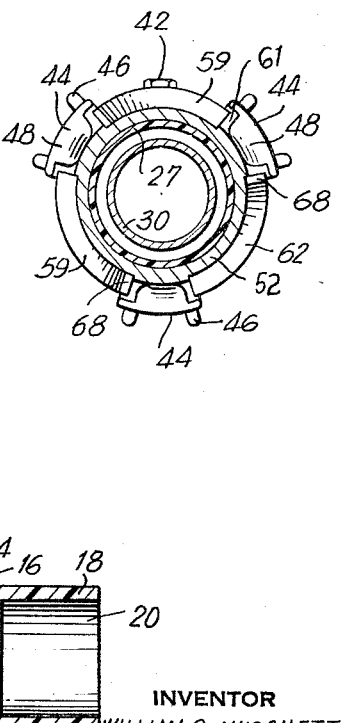
INVENTOR
WILLIAM G. MUSCHETT
BY
Kinschstein, Kinschstein & Ottinger
ATTORNEYS Aug. 16, 1966
W. G. MUSCHETT
3,266,768
QUICK-CONNECT/DISCONNECT SPRINKLER COUPLING FOR
REPLACING SPRINKLERS IN AN IRRIGATION SYSTEM
Filed Aug. 4, 1965
2 Sheets-Sheet 2
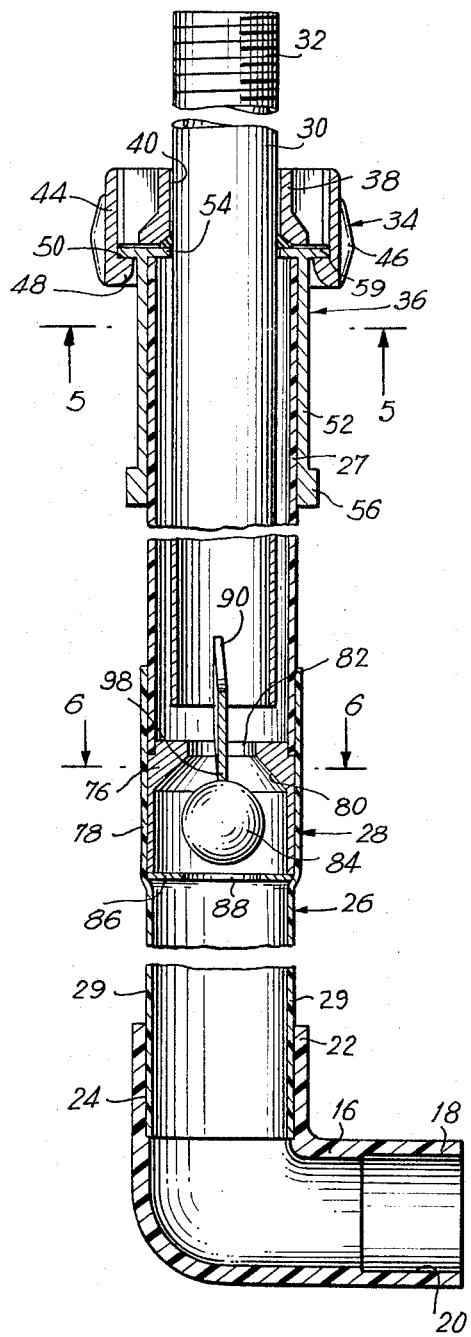
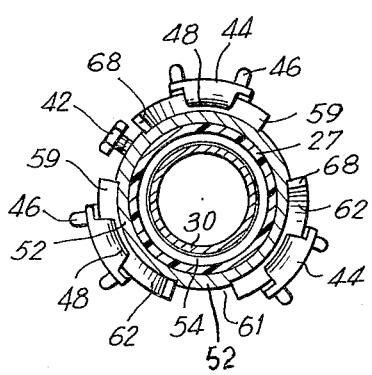
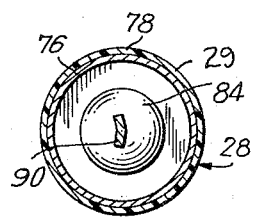
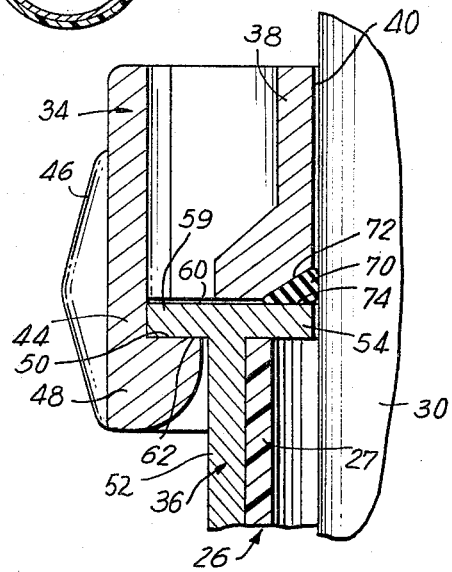
INVENTOR
WILLIAM G. MUSCHETT
BY
Kinschstein, Kinschstein & Ottinger
ATTORNEYS

United States Patent Office 3,266,768
Patented August 16, 1966

3,266,768
QUICK-CONNECT/DISCONNECT SPRINKLER COUPLING FOR REPLACING SPRINKLERS IN AN IRRIGATION SYSTEM
William G. Muschett, Dade County, Fla.
(% Safe-T-Lawn Inc., 683 W. 27th St., Hialeah, Fla.)
Filed Aug. 4, 1965, Ser. No. 477,097
7 Claims. (Cl. 251—149.5)

This invention relates to a quick-connect/disconnect sprinkler coupling for replacing sprinklers in an irrigation system and, more particularly, for facilitating the replacement of a riser pipe with a sprinkler head mounted thereon and the rejoining of the same to a riser support pipe in said system.

An irrigation system of the type utilized to promote the growth of agricultural products includes numerous sprinkler assemblies each of which sprays water or any other suitable liquid over a local section of a field or grove surrounding the sprinkler assembly. Sprinkler assemblies are spaced throughout the area to be irrigated and each sprinkler assembly is fed from a supply of liquid under pressure, e.g. a central water pumping station. Each sprinkler is supported by a concrete sprinkler stanchion which is permanently fixed into the ground. Further, each assembly includes a sprinkler head which regulates and directs a spray of water in a well known manner.

It will be appreciated that sprinkler heads when employed in this type of an irrigation system will often need repair or replacement. This may be necessitated as when dirt or other foreign matter clogs the sprinkler head, when the sprinkler head wears or becomes corroded, when parts become deformed or break, when a spring fails and when the sprinkler head has to be adjusted or replaced in order to obtain a different area of coverage or a different form of spray.

Heretofore, repair or replacement of sprinkler heads in the described type of irrigation system was a time consuming process. Each replacement required that the water being fed to the sprinkler assembly first be shut off, then the sprinkler head had to be detached from a riser pipe, the sprinkler head repaired or replaced, and then the water supply to the sprinkler assembly again restored. The time involved in each of these steps required that several laborers be employed to keep a large irrigation system in full operation. Since several assemblies are connected to the same branch water main, several assemblies were simultaneously deprived of water so that unnecessarily large areas were not irrigated during the replacement of a single sprinkler head.

Accordingly, my present invention has for its primary object the provision of a sprinkler coupling permitting the quick and efficient replacement or repair of sprinkler heads in an irrigation system without the necessity of turning off the water supply to any sprinkler assemblies during the course of the replacement or repair.

It is a further object of my invention to provide a quick-connect/disconnect sprinkler coupling of the character described wherein valve means is provided which automatically shuts off the water supply to an individual sprinkler assembly whenever the sprinkler head is removed therefrom.

It is a further object of my invention to provide a quick-connect/disconnect sprinkler coupling of the character described wherein the valve means, after blocking the water supply when the sprinkler head is removed, again permits water passage as soon as the sprinkler head is replaced on the assembly.

It is another object of my invention to provide a quick-connect/disconnect sprinkler coupling of the character described wherein telescoping of a sprinkler head carrying riser pipe into a riser support pipe held within the stanchion and relative rotation of these pipes through less than one revolution securely mechanically and hydraulically interlocks these pipes and places the sprinkler assembly back into operation.

It is still another object of my invention to provide a quick-connect/disconnect sprinkler coupling of the character described wherein sealing means is provided which prevents water leakage from the joint between the pipes when the sprinkler head is in operation.

It is yet another object of my invention to provide a quick-connect/disconnect sprinkler coupling of the character described wherein the sealing means absorbs shocks applied to the sprinkler assembly by rotation of the sprinkler head.

It is a further object of my invention to provide a quick-connect/disconnect sprinkler coupling of the character described which is simple and few in its number of parts, which is mass-producible so that it can be marketed at a relatively low cost, which is adapted to be installed into existing irrigation systems, and which can be incorporated into such systems with comparatively little expenditure of time or money.

Other objects of my invention in part will be obvious and in part will be pointed out hereinafter.

My invention accordingly consists in the features of construction, combinations of elements and arrangements of parts which will be exemplified in the sprinkler coupling hereinafter described and of which the scope of application will be indicated in the appended claims.

In the accompanying drawings in which is shown one of the various possible embodiments of my invention, FIG. 1 is a perspective partially broken away view of my quick-connect/disconnect sprinkler coupling incorporated into a sprinkler assembly;

FIG. 2 is an enlarged elevational partially axial cross-sectional view of my sprinkler coupling and showing the riser pipe immediately before engagement with the riser support pipe;

FIG. 3 is a transverse cross-sectional view of my sprinkler coupling taken substantially along the line 3—3 of FIG. 2;

FIG. 4 is a cross-sectional view similar to FIG. 2 but in full section and showing the riser pipe mechanically and hydraulically locked to the riser support pipe;

FIGS. 5 and 6 are transverse cross-sectional views of the sprinkler coupling taken, respectively, substantially along the lines 5—5 and 6—6 of FIG. 4; and FIG. 7 is a greatly enlarged fragmentary sectional view of the quick-connect/disconnect means for mechanically and hydraulically interlocking the riser pipe and the riser support pipe.

Referring now in detail to the drawings, the reference numeral 10 denotes a sprinkler assembly constructed in accordance with my invention. There are numerous sprinkler assemblies similar to the one illustrated in an irrigation system of the type suited to water an area in which agricultural products are grown. The sprinkler assemblies are located at suitably spaced sites throughout the area.

Each sprinkler assembly 10 includes at the topmost portion thereof a sprinkler head 12, any type of sprinkler head suited for water irrigation purposes being suitable for use with my invention. The circularly stepping flutter jet head 12 illustrated in FIG. 1 is exemplificative and is known in the trade as a "Rain Bird" sprinkler.

Each sprinkler assembly includes a vertically elongated heavy stanchion, i.e. post, 14 which locates and supports the remaining components of the sprinkler assembly. The stanchion is desirably rectangular in transverse cross-section and is formed from concrete having a high compression strength. Part or even the complete stanchion, except for its upper end, is embedded in the ground.

A right angle elbow 16 is located within the stanchion 14 and has a horizontal leg 18 located with its mouth flush with the exterior surface of a side wall of the stanchion. The elbow 16 has a slightly enlarged internal socket 20 at the end of the leg 18 so that it can be mechanically and hydraulically coupled, e.g. with an adhesive, to an end of a branch pipe (not shown) received therein which leads a pressurized supply of any irrigating liquid, e.g. water, for the sprinkler assembly 10, from for example a central water pumping station.

It will be apparent that any conventional means for connecting the elbow 16 to a branch pipe may be utilized with the present invention.

The elbow 16 has a vertical leg 22 with an internal socket 24 to receive the end of an elongated riser support pipe 26, i.e. a stand pipe. The riser support pipe is located centrally and axially of the stanchion 14 and is vertically oriented. It extends upwardly from the elbow 16 through the remainder of the length of the stanchion and includes an upper section 27 and a lower section 29. Desirably, the stanchion 14 is cast about the riser support pipe 26 and the elbow 16 so that these elements are permanently secured therein. The riser support pipe 26 as well as the elbow 16 are desirably formed from polyvinyl chloride (PVC).

Valve means generally designated by reference numeral 28 is located in, and, desirably, intermediate the ends of, the riser support pipe and will be subsequently more fully described. By virtue of its location, said valve means controls the flow of water through the sprinkler assembly 10. The valve means 28 comprises a uni-directional inflow ball check valve.

The sprinkler assembly 10 further includes an elongated metal riser pipe 30. The sprinkler head 12 is mounted on a threaded upper end 32 of the riser pipe.

Quick-connect/disconnect coupling means including two coupling members 34, 36 enable a grower to quickly remove, disconnect, replace and reconnect the riser pipe 30 to the riser support pipe 26.

The foregoing constitute the major components of my invention.

Describing these components in greater detail, the riser pipe 30 is a standard metal pipe, e.g. steel or iron, and is desirably of constant internal and external diameter. It has an external diameter less than the internal diameter of the upper section 27. Since the riser pipe 30 is of lesser diameter than the diameter of the upper section of the riser support pipe 26, these pipes can be telescoped with the lower end of the riser pipe 30 nested within the upper end of the riser support pipe 26. By way of example the riser pipe may be of one inch outside diameter and formed from galvanized iron while the riser support pipe has an internal diameter of one and one-quarter inches. A typical riser pipe has a length of from about five inches to about thirty feet.

As has been previously mentioned, the quick-connect/disconnect means for mechanically and hydraulically interlocking the pipes includes two coupling members 34, 36. The upper coupling member 34 is appropriately designated a twist collar and is of annular configuration. It is secured to and circumscribes the riser pipe 30. To this end, said twist collar 34 has an internal cylindrical tubular wall 38 which defines a through bore 40 of a diameter only slightly larger, e.g. 3 to 5 hundredths of an inch larger, than the external diameter of the riser pipe 30. The riser pipe 30 slidably fits through the bore 40 of the twist collar 34, and the twist collar 34 is adjustably secured to the riser pipe at a proper point along the length of the latter, as by a set screw 42 threaded into the wall 38, so that the internal end thereof bites by rotation of the set screw into said pipe. The twist collar 34 further includes plural, e.g. three, radially outwardly protruding and downwardly depending fingers 44. Each of the fingers 44 is reinforced by two integral external ribs 46. The fingers 44 are equally spaced 120° apart around the circumference of the coupling member 34 and thus around the riser pipe 30.

Each of the fingers carries a cam follower 48, said cam follower comprising a radially inwardly directed protrusion on the lower end of each finger and located at a level lower than the wall 38. The cam followers are spaced apart similarly to the fingers 44 and each cam follower 48 includes a horizontal upwardly facing cam engaging surface 50, the three surfaces 50 defining a plane perpendicular to the axis of the riser pipe 30, and said followers lying on a circle having a radius considerably larger than that of the riser support pipe.

The other and bottom coupling member 36 may be appropriately designated an anchor collar and has a cylindrical wall 52 of sufficiently large internal diameter to snugly receive the upper end of the upper section 27 of the riser support pipe 26. The anchor collar 36 is mechanically and hydraulically permanently secured to the top end of the upper section 27, as by being adhered thereto by an epoxy cement. The anchor collar 36 has a radially inwardly protruding annular flange 54 at the top of the wall 52 which is of smaller internal diameter than the top end of the upper section 27 and which thereby overlies and locates the anchor collar 36 relative to the upper section 27. Approximately the lower half of the anchor collar 36 is embedded in the stanchion 14 and to inhibit rotation of said collar 36 in the stanchion, three outwardly protruding and equally spaced lugs 56 and ribs 58 are formed on the external periphery of said collar.

The upper end of the anchor collar 36 carries three equally circumferentially spaced camming ramps 59. The ramps 59 have top surfaces 60 which lie in the same plane as the top surface of the annular flange 54, this plane being perpendicular to the axis of the riser pipe 30.

Each ramp 59 has a like bottom camming surface 62 on which an associated cam follower 48 rides. That is, each of the fingers 44 of the twist collar 34 will, when the collars are interlocked, engage a different one of the camming ramps 59 of the anchor collar 36. Each camming surface 62 includes a lead-in sloped portion 64 and a dwell portion 66 (see FIG. 2). The sloped portion 64 descends from the top toward the bottom of the anchor collar 36 and circumferentially of the collar (from right to left as seen in FIG. 2) and fairs into the adjacent dwell portion 66. The dwell portions lie in a common plane generally perpendicular to the axis of the riser pipe 30. At the end of each ramp 59, there is an axial stop 68 which prevents rotation of the cam follower 48 beyond this point. The anchor collar 36 at locations between stop 68 of one ramp and the sloped portion 64 of a different ramp 59 defines circumferential notches 61, there being a notch of equal length between each two adjacent ramps 59.

The coupling members 34, 36 are quickly but detachably mechanically interlocked by telescoping the lower end of the riser pipe 30 into the upper end of the riser support pipe 26 so that the collars are axially approached towards one another. As the collars approach, the pipe 30 is angularly oriented so that the fingers 44 of the twist collar 34 pass the top of the anchor collar 36, with each finger and its cam follower 48 traveling down through a notch 61 between the end of one ramp 59 and the stop 68 of the adjacent ramp (see FIG. 3). Then the twist collar 34 and the riser pipe are rotated so that the engaging surface 50 of each of the cam followers rides along the camming lead-in surface 62 of an associated ramp 59. The cam followers 48 ride along their associated camming surfaces 62 so that the collars are wedged axially toward one another. Thus, the collars are mechanically interengaged and consequently the riser pipe is mechanically locked to the riser support pipe, all by simply telescoping the pipes and relatively rotating them through less than one revolution, e.g. through less than 120°. The nesting of the riser pipe internally of the riser support pipe insures that the riser pipe will be held erect in stable condition.

The collars 34, 36 and thus the pipes, are mechanically unlocked and separated simply by counter-rotating the fingers 44 on the twist collar 34 in an opposed direction until the cam followers 48 clear the cam ramps 59, then the couplings with their pipes are pulled away from one another, the fingers passing back out through the notches 61.

Means is provided for hydraulically sealing the pipes to one another against water leakage when the pipes are telescoped and mechanically interlocked. Said means includes a ring of elastomeric material, e.g. a conventional sealing O-ring 70, located between the collars 34, 36 and circumferentially of the riser pipe 30. The twist collar 34 has formed at the bottom of its wall 38 an annular concentric downwardly diverging conical surface 72 which receives the upper side of the O-ring 70. The anchor collar 36 has the top horizontal surface 74 of its annular flange 54 contacting (when the collars are mechanically interengaged) the other side of the O-ring 70. The surfaces 72, 74 are properly proportioned so that when the O-ring is in repose, i.e. not under pressure, this being when the collars are not mechanically interengaged, the O-ring extends below the wall 38 of the twist collar. It will be obvious the said surfaces 72, 74 from an annular seat for the O-ring, said seat having an open mouth (side) facing the riser pipe 30.

The axial wedging action between the collars previously described will force the horizontal surface 74 towards the conical surface 72, thereby squeezing the O-ring therebetween. The pressure exerted by the collars forces the O-ring against the conical surface 72, against the horizontal surface 74 and against the outside diameter of the riser pipe 30. Accordingly, this seals all three of these components to one another against water leakage.

The valve means 28 is located anywhere between the ends of the riser support pipe 26 and at the junction of the upper section 27 and lower section 29. By selecting appropriate lengths of the two sections the position of the valve means can be adjusted before installation to any desired height. In rocky soil, for example, it usually will be preferable for the valve to be close to the surface. At other times the valve will be at a lower level to increase stability of the riser.

Said valve means includes a generally cylindrical diecast metal casing 76 which is seated in a spigot well 78 formed in the upper end of the lower section 29. The exterior diameter of the casing 76 is greater than the internal diameter of the remainder of the lower section 29 so that it cannot pass beyond the shoulder at the bottom of the spigot well 78. The spigot well 78 also receives the lower end of the upper section 27 above the casing, effecting a conventional juncture between these pipe sections. The sections 27, 29 are secured to one another as for example by a conventional adhesive.

The upper end of the casing 76 has formed therein a truncated conical upwardly converging internal seat 80. A large diameter aperture 82 passes through the center of the seat axially of the riser support pipe 26.

A closure plug, a ball 84 of elastomeric material, is captive but freely movable within the casing 80. The ball 84 is of larger diameter than the aperture 82 and so cannot pass through the casing at this end. The ball is retained within the casing on the other end by a washer 86 having a central aperture 88 also of a diameter smaller than that of the ball 84. The washer is held at the bottom of the spigot well.

When the irrigating system is in operation the riser support pipe 26 is filled with water under pressure and this pressure forces the ball 84 against the seat 80 thus sealing the aperture 82 against water passage and consequently preventing passage of water through the riser support pipe 26. When the system is first started the ball is resting on the washer 86 so that water first flows through the aperture 82. The movement of the water lifts the ball against the seat 80 whereupon the aforesaid sealing action takes place stopping further flow.

The riser pipe 30 carries an operator which when the pipes are telescoped moves (unseats) the valve means 28 to a position wherein water is permitted to flow through the coupled pipes. The operator comprises a tongue 90 which is secured in the bottom end of the riser pipe 30. The tongue 90 includes two like wings 92 which frictionally engage the internal surface of the lower end of the riser pipe 30, and each wing 92 ends in a radially outwardly protruding nib 94 which acts as a stop to prevent the tongue from entering too far into said end of the pipe. The tongue has a curved body portion 96 and is formed from a metal, e.g. galvanized iron or steel, which is yieldable under transverse pressure so that the tongue 90 can be forced into the end of the riser pipe 30 as by a hammer and remain frictionally engaged therein. The curved body portion 96 of the tongue permits the tongue to "give" i.e. to flex so as to undergo a reduction of its transverse width, thus enabling it to fit into said end. The curvature of the body also enables the tongue to be spread, i.e. to have its width increased as by hitting it with a hammer, if the internal diameter of the riser pipe is oversize. The tongue has an axially downwardly protruding tapered tip 98 which is adapted to extend through the aperture 82 in the valve means seat 80 (see FIG. 4). Accordingly, when the pipes are telescoped, the tip 98 of the tongue 90 protrudes into the valve seat so as to move and keep the ball 84 off the aperture 82 and thus permit the flow of water through the valve means 28.

The operation of my novel quick-connect/disconnect sprinkler coupling will now be obvious. When it is necessary to repair or replace a sprinkler head 12, the riser pipe 30 is rotated to disengage the coupling members 34, 36 and then the riser pipe is pulled out of the riser support pipe 26 and away from the stanchion 14. With the removal of the riser pipe 30, the tongue 90 is lifted out of the valve seat 80, permitting a small flow of water and thereafter the water pressure in the riser support pipe will move to hold the closure ball 84 in said seat, thereby preventing further flow as long as the riser pipe is removed.

It is thus evident that the otherwise conventional step of turning off a central water supply and thus preventing irrigation of a large section of the agricultural area is eliminated. In its stead, only one sprinkler assembly 10 is temporarily isolated from water feed and automatically shut off.

The grower may then repair or replace the sprinkler. If he desires, he may immediately put into place another sprinkler head 12 mounted on another riser pipe 30, taking the sprinkler head 12 with him to a central repair station. In this way, the irrigation around the sprinkler assembly 10 is but momentarily interrupted for substitution of sprinkler heads mounted on riser pipes.

To reengage a sprinkler head 12 on a riser pipe 30, first a twist collar 34 is slipped over the bottom of the riser pipe 30 and the set screw 42 tightened so that the collar is fixed to said pipe. Then the tongue 90 is forced into the end of the riser pipe.

Care must be taken regarding the location of the twist collar 34 on the riser pipe 30, since it is necessary that when the collars 34, 36 are interengaged the tip 98 of the tongue enter into the valve seat 80 far enough to force the ball off its seat but not so far as to force the ball against the washer 86. Of course, it will be remembered that the anchor collar 36 is permanently fixed in the top of the stanchion 14 around the upper end of the riser pipe 26. The riser pipe 30 is locked to the riser support pipe 26 by telescoping the pipes with the riser pipe 30 nested within the riser support pipe 26. The pipes are finally mechanically and hydraulically interlocked by rotation, thus causing the collars 34, 36 to wedge axially toward each other, thereby causing the O-ring 70 to elongate transversely under compression and prevent water leakage between the pipes. As has been mentioned, the tongue 90 now again opens the valve means 28 so that water flow is resumed and the sprinkler assembly is placed back in operation.

It will be noted that because the O-ring 70 is held under compression between the riser pipe 30 and the coupling 36 which is functionally unitary with the support pipe 28, the O-ring acts additionally as a cushion and shock absorber between the pipes, and deadens shock and impact given to the sprinkler assembly 10 by the repeated hydraulic impact that rotates and flutters the sprinkler head 12.

It thus will be seen that I have provided a device which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful and desire to secure by Letters Patent:

1. In an irrigation system, a quick-connect/disconnect sprinkler assembly, comprising:
   (a) an elongated removable straight riser pipe adapted to carry sprinkler head at its upper end, said riser pipe over a major portion thereof, including its lower portion, being a substantially constant external diameter,
   (b) an elongated support pipe fixed vertically upright in the ground and containing water under pressure at least in the lower portion thereof when in operation, the internal diameter of the support pipe being substantially constant and greater than the external diameter of the lower portion of the riser pipe,
   (c) valve means mounted within the support pipe downwardly and remotely from its upper end a distance many times the internal diameter of the support pipe, said valve means being arranged to be held by the water pressure in the fixed support pipe in closed position blocking water flow in the support pipe and being mounted for movement against the water pressure to an open position unblocking said support pipe and permitting water flow, said support pipe being unobstructed and straight above the valve means so that the lower end of the riser pipe is telescopically insertable deeply into the support pipe,
   (d) a coupling for detachably mechanically and hydraulically joining the pipes, said coupling including
      (i) a set of mechanically interengageable coupling members, one of the members being fixed to the support pipe at its upper end upwardly and remotely from the valve means and the other member being fixed to the riser pipe upwardly and remotely from its lower end, said other member being disposed longitudinally of the riser pipe in a position to locate the lower end of the riser pipe proximate to and above the valve means, said coupling members being slid toward one another when the pipes are telescoped, the riser pipe being of constant external diameter below its coupling member, substantial portions of the riser pipe and the support pipe including the upper portion of the support pipe and the lower portion of the riser pipe, being coextensive when the pipes are telescoped, and
      (ii) resilient means adjacent the upper end of the support pipe hydraulically sealing the pipes to one another and acting as a shock absorber when the pipes are telescoped and the coupling members are engaged,
   (e) means adjustably locating the coupling member fixed to the riser pipe along the length thereof, and
   (f) an operator carried by and depending from the riser pipe at its lower end and having a maximum transverse diameter not greater than the external diameter of the riser pipe, said operator contacting and moving the valve means to its open position when the riser pipe is inserted into the support pipe.

2. In an irrigation system, a quick-connect/disconnect sprinkler assembly, comprising:
   (a) a removable straight riser pipe carrying a sprinkler head,
   (b) an elongated support pipe fixed vertically upright in the ground and containing water under pressure at least in the lower portion thereof when in operation, the internal diameter of the support pipe being greater than the external diameter of the riser pipe,
   (c) valve means mounted within the support pipe downwardly and remotely from its upper end, said valve means being arranged to be held by the water pressure in the fixed support pipe in closed position blocking water flow in the support pipe and being mounted for movement against the water pressure to an open position unblocking said support pipe and permitting water flow, said support pipe being unobstructed and straight above the valve means so that the lower end of the riser pipe is telescopically insertable deeply into the support pipe, said valve means including a casing having an aperture valve seat an a closure plug contained within the casing, the support pipe including two sections interengaged by a spigot and bell joint, the casing being housed within the bell,
   (d) a coupling for detachably mechanically and hydraulically joining the pipes, said coupling including
      (i) a set of mechanically interengageable coupling members, one of the members being fixed to the support pipe at its upper end and the other member being fixed to the riser pipe above its lower end, said other member being disposed longitudinally of the riser pipe in a position to locate the lower end of the riser pipe proximate to and above the valve means, said coupling members being slid toward one another when the pipes are telescoped, and
      (ii) resilient means adjacent the upper end of the support pipe hydraulically sealing the pipes to one another and acting as a shock absorber when the pipes are telescoped and the coupling members are engaged, and
   (e) an operator carried by and depending from the riser pipe at its lower end and contacting and moving the valve means to its open position when the riser pipe is inserted into the support pipe.

3. In an irrigation system, a quick-connect/disconnect sprinkler assembly, comprising:
   (a) a removable straight riser pipe carrying a sprinkler head,
   (b) an elongated support pipe fixed vertically upright in the ground and containing water under pressure at least in the lower portion thereof when in operation, the internal diameter of the support pipe being greater than the external diameter of the riser pipe, (c) valve means mounted within the support pipe downwardly and remotely from its upper end, said valve means being arranged to be held by the water pressure in the fixed support pipe in closed position blocking water flow in the support pipe and being mounted for movement against the water pressure to an open position unblocking said support pipe and permitting water flow, said support pipe being unobstruced and straight above the valve means so that the lower end of the riser pipe is telescopically insertable deeply into the support pipe, (d) a coupling for detachably mechanically and hydraulically joining the pipes, said coupling including (i) a set of mechanically interengageable coupling members, one of the members being fixed to the support pipe at its upper end and the other member being fixed to the riser pipe above its lower end, said other member being disposed longitudinally of the riser pipe in a position to locate the lower end of the riser pipe proximate to and above the valve means, said coupling members being slid toward one another when the pipes are telescoped, and (ii) resilient means adjacent the upper end of the support pipe hydraulically sealing the pipes to one another and acting as a shock absorber when the pipes are telescoped and the coupling members are engaged, and (e) an operator carried by and depending from the riser pipe at its lower end and contacting and moving the valve means to its open position when the riser pipe is inserted into the support pipe, the operator comprising a tongue including two like wings frictionally engaging the internal surface of the lower end of the riser pipe, a radially protruding nib at the end of each wing preventing the tongue from entering too far into the lower end of the riser pipe, a curved body between the wings, and a tapered tongue projecting axially downwardly from said lower end.

4. In an irrigation system, a quick-connect/disconnect sprinkler assembly, comprising:

(a) a removable straight riser pipe carrying a sprinkler head, (b) an elongated support pipe fixed vertically upright in the ground and containing water under pressure at least in the lower portion thereof when in operation, the internal diameter of the support pipe being greater than the external diameter of the riser pipe, (c) valve means mounted within the support pipe downwardly and remotely from its upper end, said valve means being arranged to be held by the water pressure in the fixed support pipe in closed position blocking water flow in the support pipe and being mounted for movement against the water pressure to an open position unblocking said support pipe and permitting water flow, said support pipe being unobstructed and straight above the valve means so that the lower end of the riser pipe is telescopically insertable deeply into the support pipe, (d) a coupling for detachably mechanically and hydraulically joining the pipes, said coupling including (i) a set of mechanically interengageable coupling members, one of the members being fixed to the support pipe at its upper end and the other member being fixed to the riser pipe above its lower end, said other member being disposed longitudinally of the riser pipe in a position to locate the lower end of the riser pipe proximate to and above the valve means, said coupling members being slid toward one another when the pipes are telescoped, the coupling members both being located externally of their respective pipes and adjacent surfaces of the coupling members conjointly defining an annular seat, the seat having a mouth opening radially toward the riser pipe, and (ii) resilient means adjacent the upper end of the support pipe hydraulically sealing the pipes to one another and acting as a shock absorber when the pipes are telescoped and the coupling members are engaged, the resilient hydraulic sealing means including an annular elastomeric sealing element snugly circumscribing the riser pipe and located in said seat, so that when the coupling members are interengaged the sealing element is squeezed therebetween and against the riser pipe thereby to hydraulically seal and cushion said riser pipe, and (e) an operator carried by and depending from the riser pipe at its lower end and contacting and moving the valve means to its open position when the riser pipe is inserted into the support pipe.

5. In an irrigation system, a quick-connect/disconnect sprinkler assembly, comprising:

(a) a removable straight riser pipe carrying a sprinkler head, (b) an elongated support pipe fixed vertically upright in the ground and containing water under pressure at least in the lower portion thereof when in operation, the internal diameter of the support pipe being greater than the external diameter of the riser pipe, (c) valve means mounted within the support pipe downwardly and remotely from its upper end, said valve means being arranged to be held by the water pressure in the fixed support pipe in closed position blocking water flow in the support pipe and being mounted for movement against the water pressure to an open position unblocking said support pipe and permitting water flow, said support pipe being unobstructed and straight above the valve means so that the lower end of the riser pipe is telescopically insertable deeply into the support pipe, (d) a coupling for detachably mechanically and hydraulically joining the pipes, said coupling including (i) a set of mechanically interengageable coupling members, one of the members being fixed to the support pipe at its upper end and the other member being fixed to the riser pipe above its lower end, said other member being disposed longitudinally of the riser pipe in a position to locate the lower end of the riser pipe proximate to and above the valve means, said coupling members being slid toward one another when the pipes are telescoped, both coupling members being annular, each circumscribing the pipe to which it is fixed and being located externally thereof, one of the members including an axially sloped circumferentially extending camming ramp one end of which is higher than the other, and the other member including a cam follower ridable on the ramp after the members are slid toward one another whereby the members are wedgingly interengaged when they are relatively rotated through an arc of less than 360° after being slid toward one another, and (ii) resilient means adjacent the upper end of the support pipe hydraulically sealing the pipes to one another and the coupling members are engaged, the hydraulic sealing means comprising an elastomeric sealing ring located between the coupling members and snugly circumscribing the riser pipe, said ring being squeezed between the members when said members are wedgingly interengaged, and (e) an operator carried by and depending from the riser pipe at its lower end and contacting and moving the valve means to its open position when the riser pipe is inserted into the support pipe.

6. A quick-connect/disconnect sprinkler assembly as set forth in claim 5 wherein at least one member has a flaring annular surface facing the riser pipe and the other member to define with the other member an annular seat having a mouth that opens toward the riser pipe whereby when the ring is squeezed between the members it also will be forced against the outside of the riser pipe.

7. A quick-connect/disconnect sprinkler assembly as set forth in claim 1 wherein the hydraulic sealing means comprises an elastomeric sealing ring located between the coupling members and snugly circumscribing the riser pipe, said ring being squeezed between the members when said members are wedgingly interengaged.

References Cited by the Examiner

UNITED STATES PATENTS

| | | | |
|---|---|---|---|
| 1,497,283 | 6/1924 | Petrequin | 251—149.5 |
| 1,762,503 | 6/1930 | Buckner | 251—148 |
| 2,822,192 | 2/1958 | Beatty | 285—404 |

FOREIGN PATENTS

| | | |
|---|---|---|
| 546,074 | 3/1956 | Belgium. |
| 320,816 | 4/1902 | France. |
| 545,168 | 2/1922 | France. |

M. CARY NELSON, *Primary Examiner.*

W. CLINE, *Assistant Examiner.*